United States Patent [19]

Hackett

[11] Patent Number: 5,089,995

[45] Date of Patent: Feb. 18, 1992

[54] SWITCHING SYSTEM FOR THE ACQUISITION OF SEISMIC DATA

[75] Inventor: Gary K. Hackett, Yorba Linda, Calif.

[73] Assignee: Union Oil Company of California, Los Angeles, Calif.

[21] Appl. No.: 620,354

[22] Filed: Nov. 29, 1990

[51] Int. Cl.$^5$ .............................................. G01V 1/22
[52] U.S. Cl. ...................... 367/76; 367/13; 367/78
[58] Field of Search ...................... 367/20, 76, 177, 78, 367/58, 59, 154, 13; 340/858

[56] References Cited

U.S. PATENT DOCUMENTS

| | | |
|---|---|---|
| 3,400,782 | 9/1968 | Green . |
| 4,280,201 | 7/1981 | Mart et al. .......................... 367/78 |
| 4,283,778 | 8/1981 | Meyer et al. ....................... 367/58 |
| 4,308,598 | 12/1981 | Mahmood ......................... 367/79 |

Primary Examiner—Ian J. Lobo
Attorney, Agent, or Firm—Gregory F. Wirzbicki; Clark E. DeLarvin

[57] ABSTRACT

A seismic recording system comprises a multichannel recorder connected to a cable formed from a plurality of signal conductors. Each of the signal conductors is connected to a different channel of the recorder. The cable has a plurality of takeouts located at spaced distances along its length. Each of the takeouts is connected to a different signal conductor of the cable. The system further includes a first conduit operably connected to one of the takeouts. A plurality of remotely operable switch means are located along the length of the first conduit for selectively interconnecting the first conduit and a plurality of detector conduits upon receipt of a remotely generated signal. Each detector conduit has at least one geophone located along its length and operably connected thereto. A control means is provided for transmitting a signal to a selected switch means for interconnecting its associated detector conduit and geophones with the recorder.

21 Claims, 2 Drawing Sheets

SWITCHING SYSTEM FOR THE ACQUISITION OF SEISMIC DATA

FIELD OF THE INVENTION

The invention relates to seismic systems for the systematic surveying or exploring of extended geographical areas. The invention particularly relates to obtaining seismic data for use in locating subsurface strata which might contain valuable minerals or hydrocarbons.

BACKGROUND OF THE INVENTION

In geophysical prospecting, seismic operations are frequently performed to generate and collect information indicative of the physical properties of subsurface formations. A conventional seismic land operation includes placing a seismic cable along the surface of the earth. Usually, the cable extends in a straight line and contains a plurality of wire pairs. A typical cable will contain from 48 to about 120 wire pairs. At regular intervals along the cable, there are provided electrical connectors generally referred to as "takeouts." Each takeout is electrically connected to a separate pair of wires in the seismic cable. Typically, the takeouts are located at intervals of 50 to 200 feet along the length of the cable.

An array of geophones is attached to each takeout of the seismic cable. The array of geophones may consist of from one to fifty or more individual geophones. Each geophone is typically affixed to the surface of the earth by means of a spike so that, as the earth moves, the geophone moves as well. The geophones in any individual array are electrically interconnected so that the output signal from the group is a measure of the average motion sensed by all the geophones in that specific array.

In a typical seismic survey for a large geographical area, the area is covered by a plurality of survey lines. Seismic profiles are then recorded along these survey lines. On land, a seismic cable, typically approximately two miles in length and formed from a series of identical sections, is laid on the ground along a survey line. At each takeout, there is connected a two-wire conduit to electrically interconnect, for example, about 30 geophones into a single group or array. Each geophone group is located in the general vicinity of the take out of the seismic cable to which it is attached.

A seismic signal is generated in the vicinity of the geophone groups. Typical seismic sources include explosive charges, weight drops, or other impact sources which impart a sudden impulse of energy to the surface of the earth in the survey area. Another type of seismic source is a vibrator which imparts a vibratory sweep of energy to the earth's surface for a period of time from a few seconds to about 20 seconds. Typically, the seismic signal is imparted into the earth at regularly spaced intervals along a portion of the length of the seismic cable.

One end of the seismic cable is connected to a seismic recorder, which typically includes a magnetic tape recorder. The seismic waves from each group of geophones are recorded on the magnetic tape in digital form. A multiple position switch, referred to as a roll-along switch, in a recording truck is advanced to a new position, thereby advancing the portion of the cable connected to the data recording equipment. After the desired data have been recorded, one or more of the cable sections are disconnected from one end of the two mile length of cable and reconnected to the other end. A new data recording cycle is then undertaken. After recordings have been taken along the full length of one survey line, the cable, geophones and recorder are moved to the next survey line and the process repeated until the entire geographical area has been covered.

The foregoing type of data recording is generally referred to as the reflection method in which the seismic waves or impulses are generated at or near the earth's surface and these waves are reflected from subsurface acoustic impedance boundaries and detected by the array of seismic detectors located at the surface. Detector groups of considerable length are used preferentially in reflection seismic exploration in order to discriminate between signals and unwanted noise.

A disadvantage of having long lengths of detectors is the attenuation of high frequency signals. Attempts have been made to improve the high frequency response of seismic rays by using very short (a smaller number of detectors) arrays. The most common result is a considerable degradation of data quality owing to the decrease in signal-to-noise ratio.

It has been considered that it might be possible to restore the signal-to-noise ratio to a value comparable to that of arrays in common use by greatly increasing the number of arrays, in effect retaining the number of individual detectors in common use but subdividing them into many more but shorter arrays. A difficulty resulting example, if a full-length, 2-mile seismic cable is to be employed and if the sensor density (number of sensors) is to remain unchanged, the number of signal channels which must be connected to the recorder is increased by an order of magnitude as the group length is reduced. This would mean about 10 times as many conductor wire pairs would have to be added to the cable if the group lengths were to be significantly reduced. Such an increase in the number of conductor wire pairs would greatly increase the weight and the bulk of the cable sections and decrease their flexibility to unacceptable levels.

SUMMARY OF THE INVENTION

This invention provides a seismic testing system capable of recording data from a wider area than was heretofore possible without the need for added wires or signal conductors in the cable. It also permits the use of shorter groups of sensors in a long array, also without the need for any added wire pairs in the cable. Thus, the present invention can also be utilized to maintain a high signal-to-noise ratio while at the same time enhancing the high frequency response.

Broadly, the system comprises a multichannel recorder and a length of cable comprising a plurality of signal conductors, each of the signal conductors being connected to a different channel of the recorder. The cable is provided with a plurality of takeouts located at spaced distances along the length of the cable. Each of the takeouts is connected to a different signal conductor. The system further includes a plurality of primary conduits, each of which has one end connected to a different takeout, and a plurality of switch means, operably connected to each of said primary conduits. The switch means are located at spaced intervals along the length of the primary conduit. The system also includes a number of secondary detector conduits, each of which has an end operably connected to a different one of said switches. Each switch is operable between a position in which the primary and secondary conduits are electrically interconnected, and another position in which the primary and secondary conduits are electrically isolated from one another. An array of seismic detectors is located along the length of each of the secondary conduits and operably connected thereto. The system further includes a control means for transmitting a signal, through selected signal conductors, to a selected switch means for interconnecting an array of seismic detectors with said recorder.

Advantageously, each switch means comprises an integrated circuit which is separately addressable by an input binary code. The integrated circuit is electrically connected to a solid state switch which is operated by an electrical impulse from the integrated circuit. The solid state switch is energizable between two positions. In one position it interconnects the primary detector conduit with the array of geophones located on the associated secondary conduit. In the other position it isolates the array of geophones on the secondary conductor from the primary detector conduit and interconnects the primary detector conduit.

The switch means also may include means for maintaining the selected solid state switch(es) in a selected position. Typically this is accomplished with a battery. It is preferred to use a solid state switch of the locking type which does not require a voltage potential to maintain it in either position.

BRIEF DESCRIPTION OF THE DRAWINGS

The use and advantages of the invention will be more apparent from a consideration of the following detailed description and the drawings in which.

DETAILED DESCRIPTION OF THE INVENTION

Figure 1:
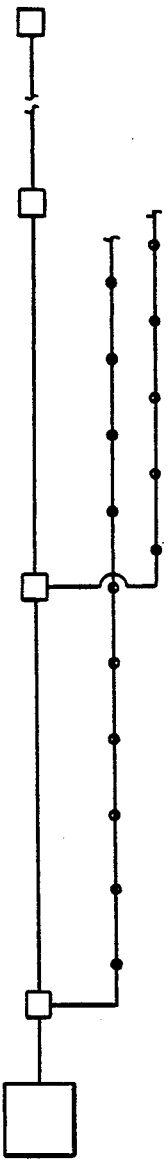
FIG. 1 is a diagram of a seismic system as hereinbefore practiced.

It is believed that a review of a prior art seismic recording system will be beneficial to a better understanding of the present invention and the advantages obtained therefrom. Referring to FIG. 1, a typical prior art seismic system utilizing a reflective method comprises a recorder 12 and a seismic conduit 14 which extends along the surface of the earth, typically along a survey line. Cable 14 generally extends a distance of approximately two miles and is made up of individual cable sections, each section having a length of about 300 to 400 feet. It will be appreciated that in many instances the cable must be laid across terrain not accessible by vehicle. Thus, the cable preferably is in lengths having a weight which can be carried by one man.

Located along the length of cable 14 are a plurality of electrical connectors or takeouts T. The number of takeouts $T_n$ is equal to the number of wire pairs making up cable 14. Typically, the takeouts T are located at substantially uniform intervals of about 50 to 100 feet. At each takeout T, there is connected thereto one or more conduits 16. As depicted, at $T_1$, there is a conduit 16 (typically comprised of two wires) which extends substantially parallel to cable 14. At substantially regular intervals along the length of conduit 16 are a plurality of individual geophones 18 which are electrically connected to the two wires of conduit 16.

When a single linearly extending conduit is utilized, it typically will have a length of about 30 to 300 feet and be provided with 1 to about 50 geophones at spaced intervals along that length. Various other configurations are utilized for certain special applications and terrain conditions. The configuration shown at $T_1$ is one commonly used.

To initiate the collection of seismic data, a seismic source signal is transmitted into the earth, for example, at VP. The source signal travels across the surface of the earth and is sensed by geophones 18. In addition, the same signal radiates downwardly through the earth and is reflected back to the geophones from subsurface boundary layers. The former is undesirable noise and the latter is the source of the signal of interest. The seismic source may be stationary or it may be moved along a portion of the length of cable 14.

It will be appreciated that, while the array of geophones is shown as extending in only one direction, in many instances it will project linearly in both directions, and in some instances the number and arrangement of geophones at each takeout T may vary. The electrical signals generated by geophones 18 and transmitted to any given takeout represent a weighted average of the signals from all the geophones in that group. That average signal passes through an individual wire pair of cable 14 to recorder 12.

It also will be appreciated by those skilled in the art that the signals passing through each wire pair of cable 14 are not directly input to a separate channel of recorder 12. Generally the signals are introduced into a multiplexer which scans each of the wire pairs in sequence for a finite length of time. Typically, the multiplexer will process approximately 1,000 samples per second from cable 14. The individual samples can be recorded in analog form. However, they are not amenable to computer processing in such form. Thus, they preferably are passed through an analog to digital convertor prior to being recorded on their respective channel of the magnetic tape recorder. In addition, amplifiers also may be provided to increase the amplitude of signals from the respective takeouts.

Once a recording has been completed, a number of sections forming cable 14 are removed from one end and reconnected to the other end, along with their conduits 16 and geophones 18, and the recording cycle repeated until the linear length of the survey line has been recorded. Thereafter, the entire length of cable 14, conduits 16, geophones 18, and recorder 12 are moved to the next survey line and recording started again. Obviously, the movement of approximately two miles of heavy cable is a labor-intensive and expensive task. The use of a long array of geophones such as shown at $T_1$ provides a high signal-to-noise ratio but detracts from its ability to receive and transmit high frequency impulses.

Figure 2:
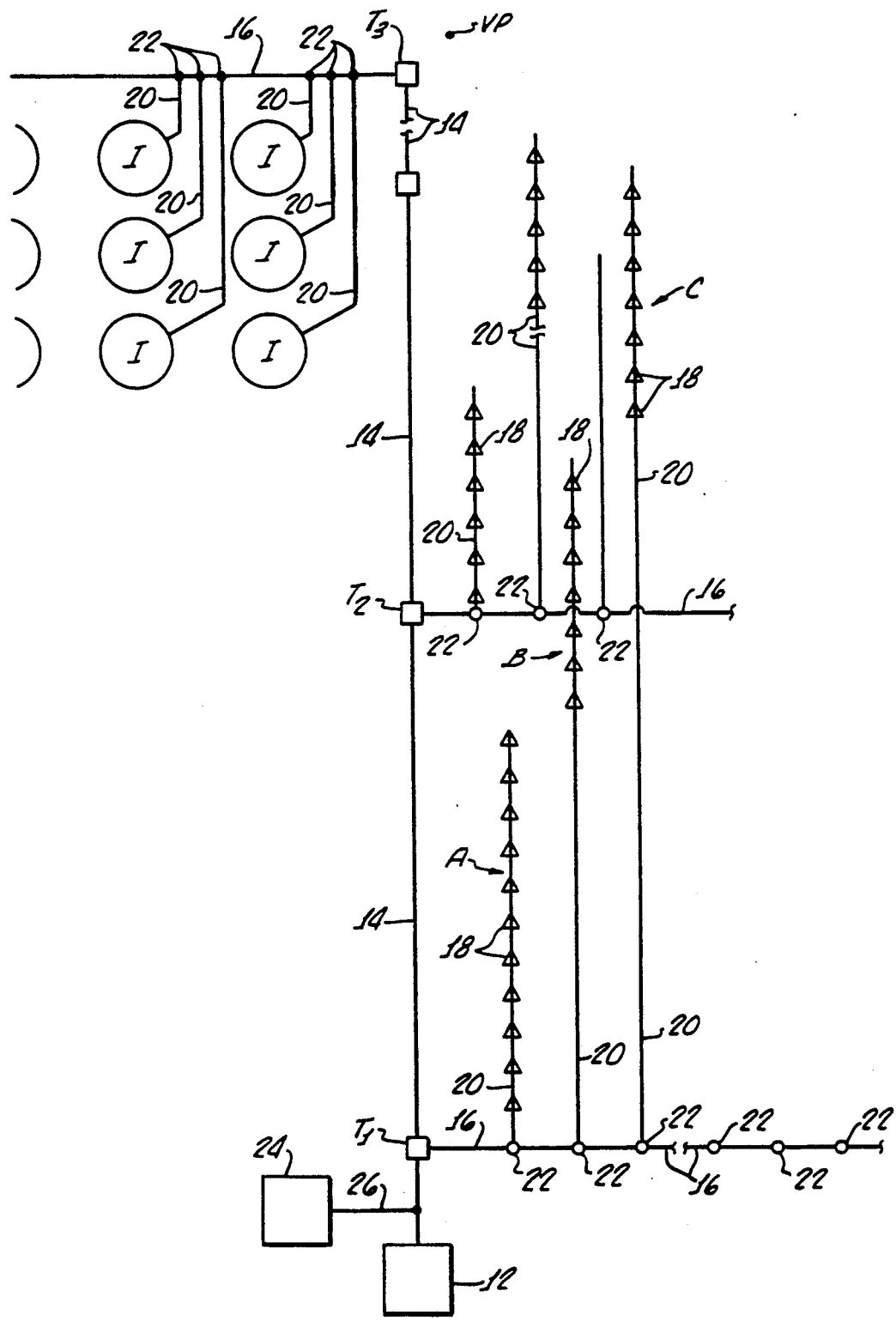
FIG. 2 is a diagram of a seismic system utilizing the present invention.

Referring now to FIG. 2, therein is shown a seismic system arranged in accordance with the present invention (like numbers in FIG. 1 referring to like parts in FIG. 2). The seismic system shown in FIG. 2, like that shown in FIG. 1, includes a recorder 12, and a seismic cable 14 comprised of a plurality of signal conductors and is provided with a number of takeouts $T_n$. The number of takeouts may be from as few as 100 to as many as 1000 or more with a fiber optic system. A typical number of takeouts for a wire pair system is about 100 to 200. A conduit 16 is attached to a signal conductor of each takeout. Typically, each conduit will have a length of from 200 feet to a mile, but in some applications they may be substantially longer. The present invention is applicable to systems using cables comprised of wire pairs or optical fibers for signal conductors. For convenience and purposes of comparison with the previously described system, the invention will be described with reference to a cable formed from a plurality of wire pairs.

For clarity, only three connections to takeouts T are shown. In contrast to the prior art, conduit 16 extends through a plurality of switch means 22, rather than directly to geophones 18. The purpose of switch means 22 is to interconnect a takeout via conduit 16 with any one or more of a plurality of arrays of geophones via a plurality of conduits 20. In the interest of clarity, only three arrays of geophones are shown attached to each of the two conduits 16 at $T_1$ and $T_2$. However, in actual practice, it is anticipated that a sufficient number of switch means 22 would be provided for attachment of from 5 to 25 and preferably from 10 to 20 separate arrays of geophones. Switch means 22 provides for selectively interconnecting a takeout to the conduit 20 associated with that particular switch (along with its associated array of geophones). The purpose for such selectivity will be described more fully later.

Switch means 22 could comprise conventional mechanical switches activated by solenoids or the like. However, in the interest of rapid switching speed and reducing the electrical power requirements of the switch, it is preferred that switch means 22 be formed from solid state circuitry.

Figure 3:
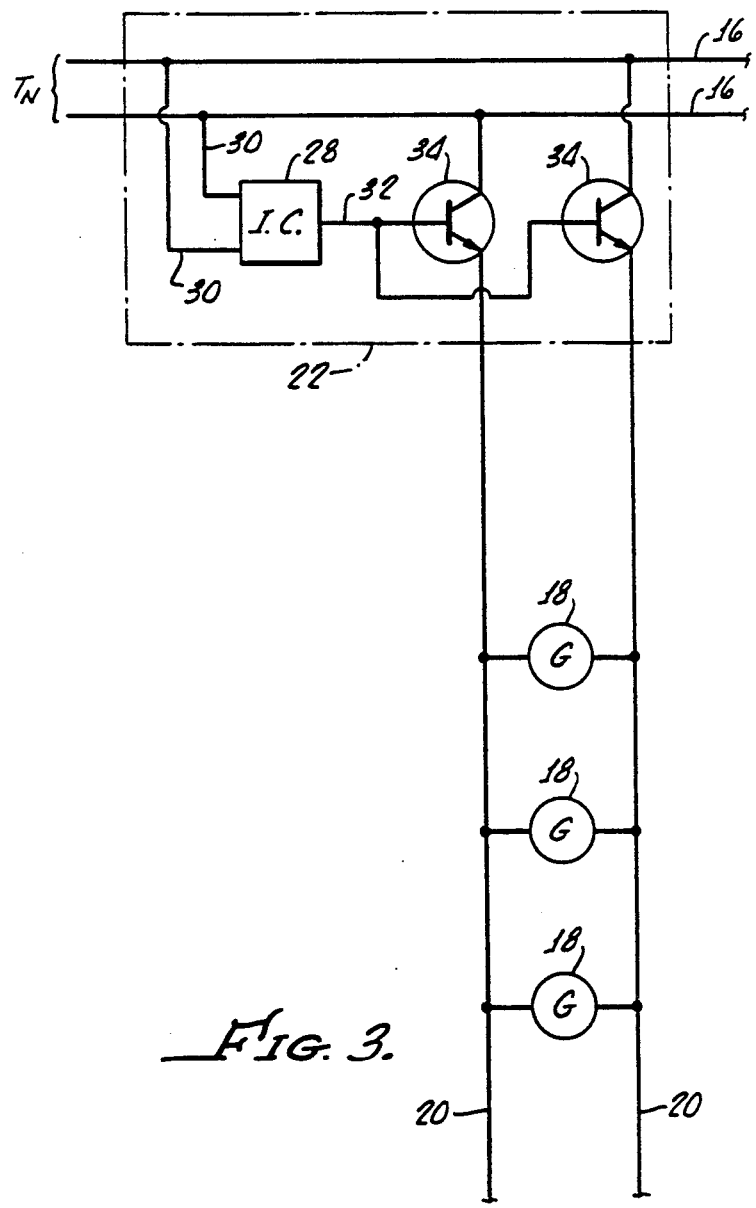
FIG. 3 is a schematic of a switch for use in the present invention.

Referring to FIG. 3, for example, switch means 22 could comprise an integrated circuit 28 connected to conduit 16 by a wire pair 30. Upon receipt of an appropriate binary code through wire pair 30, integrated circuit 28 would transmit a signal through a conductor 32 to a solid state switching device 34. The solid state switching device would, in turn, interconnect conduit 20 and its array of geophones with conduit 16 and its associated takeout. Thus, utilizing an appropriate combination of binary signals, it is possible to interconnect an array or plurality of arrays with the takeout by activation of selected switches. It will be noted that the integrated circuit is separately connected to conduit 16 such that it is always addressable by a signal through the wire pair of conduit 16 to which it is connected.

As those skilled in the art will appreciate, most solid state switches require that a voltage potential be applied to them to maintain the switch in a closed (conducting) position. This is readily accomplished with a battery. Since the power requirements of the solid state devices is low, a small 9 volt battery will generally suffice. In some instances it may be advantageous to use a rechargeable battery. The wire pair of conduit 16 associated with the switch then could be used to supply current to and recharge the battery when the the system is not recording data.

Referring back to FIG. 2, the system also includes a controller 24 which is electrically interconnected via a cable 26 to all the wire pairs being utilized in cable 14 for switch means 22. The purpose of controller 24 is to send a signal through the wire pair associated with any specific switch means 22 and thereby cause switch means 22 to interconnect designated arrays of geophones with its associated conduit 16.

Since both control signals from controller 24 and input signals from geophones 18 are conveyed over the same wire pair, some means for differentiating between the two signals is required to prevent switch means 22 from interpreting a geophone signal as a control signal. A preferred way of accomplishing this, in accordance with the present invention, is to use a relatively high amplitude signal for control. The input signal from the geophones will have a relatively low amplitude. Thus, the controller and switch means are readily designed to cooperatively operate only at a higher voltage amplitude than will be produced in normal operation by the geophones.

Preferably, controller 24 is a computer which can be utilized to either manually generate the desired digital signal or programmed to automatically generate a series of signals for interconnecting selected arrays of geophones with cable 14. Specifically, the computer can be programmed for sampling of the inputs to the various takeouts and also sample individual arrays of geophones connected through switch means 22. Thus the present invention provides a degree of versatility far beyond that possible with the prior art systems.

The practice of the present invention will be described by comparison with the operation of a prior art seismic system. It is believed such comparison will more clearly illustrate the practice and advantages of the present invention.

Referring to FIG. 1, for purposes of illustration, assume cable 14 has a length of 10,000 feet and is provided with 100 takeouts. Each takeout has a general configuration as shown at $T_1$, namely, the takeout is provided with an array comprising a linearly extending cable 16 having a length of 150 feet. Cable 16 is provided with 30 geophones 18 at evenly spaced intervals. The arrays of geophones overlap one another. The purpose of the overlap of arrays is to enhance the signal to noise ratio of the signals received.

Such a system would have a relatively high signal-to-noise ratio by virtue of the length of the arrays. However, the length would be such as to attenuate high frequency signals which could be of value in assessing subterranean geological formations. Any changes in the number of geophones, length of the array, or arrangement of the array would necessitate manually connecting, disconnecting, or moving individual geophones. Clearly, this system provides little flexibility once it is installed and involves a substantial amount of physical labor moving it from one location to another.

Referring now to FIG. 2, utilizing a cable 14 having the same length and an equal number of takeouts, a controller and a plurality of switch means 22 along the length of conduit 16 as hereinabove described, at each switch means there are several linearly extending arrays of geophones which may be arranged and utilized in several ways. For example, as depicted, it is possible to utilize three or more arrays of various lengths. The arrays from each switch means 22 could still overlap as in FIG. 1

Group A would have a length of 50 feet and contain an array of 10 geophones along its entire length. Group B would have a length of 100 feet and contain an array of 10 geophones extending 50 feet beyond Group A. Group C would then have a length of 150 feet with an array of 10 geophones extending along the last 50 feet of its conduit 20. Such an arrangement of short, staggered arrays will provide the benefit of a high signal-to-noise ratio while concurrently providing an enhanced sensitivity to higher frequencies than would be obtainable with the system shown in FIG. 1.

In addition, the system depicted in FIG. 2 could be readily tuned on location for obtaining best results. As an example, a test charge could be detonated to send a seismic impulse into the earth. Data samples could then be taken from each array and various combinations of the arrays to determine which array or combination yielded the best data. In such instance it might be found that the best signal-to-noise ratio and frequency response is obtained at one take out by interconnecting $T_n$ and all the arrays of seismic geophones, whereas at another take out the best signal-to-noise ratio and frequency response might be obtained from one array to the exclusion of the others. This optimum arrangement can readily be determined by varying the arrays interconnected through the various takeouts prior to the actual acquisition of seismic data.

To obtain optimum recording results it may be preferred to use an array having a length greater than the wave length of the seismic wave having the lowest undesirable frequency. In addition, the distance between adjacent geophones should be less than the wave length of the seismic wave having the highest undesirable frequency (shortest wave length). Generally, this knowledge is not known a priori and may vary at different locations within the geographical area being surveyed. With the present invention, arrays of different length and different spacing between geophones may be used at each switch means, and the optimum array determined experimentally by firing a test shot.

It also must be appreciated that while only 3 arrays are shown attached to conduit 16 via switch means 22, it is anticipated that there typically would be from 10 to 15, thus providing an even greater diversity. Obviously, combinations of the foregoing techniques may be utilized for each of switch means 22. By combining the previously described advantage through use of a greater number of arrays connected to conduit 16 via switch means 22, it is possible to both decrease the number of lateral moves required and enhance frequency response while maintaining a high signal-to-noise ratio. These benefits and advantages are not suggested or even possible with the system such as shown in FIG. 1. Numerous other benefits and advantages obtained with the present invention will be readily apparent to those skilled in the art.

For example, one advantage of the system of the present invention is shown at $T_3$. Each array I of geophones is connected to a switch means 22 and laterally displaced from cable 14. This type of grouping permits high density recording of the immediate and laterally extending areas. Such high density recording would not be feasible with a prior art system such as is shown in FIG. 1. The time and labor involved in moving the prior art system laterally in small increments to accomplish the same high density recording would be cost prohibitive.

Another advantage of the present invention is that the number of recorder channels required is substantially reduced. Through the use of switches as hereinbefore described far more arrays of geophones may be monitored through, for example, a 120 channel recorder than would heretofore have been possible without physically disconnecting individual arrays of geophones. With the present switching arrangement it is possible to monitor in excess of at least twice as many arrays of detectors. Indeed, the present invention makes it possible to monitor from 3 to 30 or more times as many arrays than would be possible with the same recorder using prior art techniques.

It is emphasized that the foregoing description represents the preferred embodiments of the invention, and various alternative circuits or components may be utilized in the system disclosed herein without departing from the spirit of the invention. Thus, for example, different arrangements of arrays of geophones and other solid state devices may be employed. Similarly, other data processing equipment may be employed to utilize the data collected in accordance with the present invention. Accordingly, the scope of the invention is to be determined by the following claims and equivalences to which they are entitled.

What is claimed:

1. A system comprised of:
   a multichannel recorder;
   a length of cable comprising a plurality of signal conductors, each of the signal conductors being connected to a different channel of the recorder, the cable having a plurality of takeouts located at spaced distances along the length of the cable and each of the takeouts being connected to a different signal conductor;
   a first conduit operably connected to one of said takeouts;
   a plurality of switch means dispersed along said first conduit and operably connected thereto;
   a number of detector conduits, each of which has an end operably connected to a different one of said switch means;
   at least one seismic detector located along the length of each of said detector conduits and operably connected thereto; and
   control means for transmitting a signal, through selected signal conductors of said cable, to said switch means for electrically interconnecting one or more selected detector conduits with said recorder.

2. The system of claim 1 wherein said switch means comprises an integrated circuit having an outlet operably connected to a solid state switching device and each of said switch means being separately addressable by a signal.

3. The switch means of claim 2 wherein said signal is a binary electrical signal.

4. The system of claim 3 wherein said control means comprises a computer means for transmitting said binary electrical signal.

5. The system of claim 1 wherein said signal is a digital signal.

6. The system of claim 1 wherein said seismic detectors are geophones.

7. The system of claim 1 wherein said group of seismic detectors comprises from 1 to about 50 seismic detectors.

8. The system of claim 1 wherein from 2 to 50 switch means are provided along each of said first conduits.

9. The system of claim 1 wherein the cable has from 100 to 1000 takeouts located at evenly spaced distances along the length of the cable.

10. A seismic recording system comprising:
    a multichannel magnetic tape recorder;
    a cable comprising a plurality of signal conductors, each of the signal conductors being connected to a different channel of the recorder, the cable having a plurality of takeouts located at uniformly spaced distances along the length of the cable and each of the takeouts being connected to a different signal conductor;

a plurality of conduits, each of which has an end operably connected to a different one of said takeouts;

a plurality of switch means dispersed along the length of each of said conduits and operably connected thereto;

a plurality of detector conduits, each of which has an end connected to a different one of said switch means;

an array of seismic detectors located along the length of each of said detector conduits and operably connected thereto; and control means for transmitting a digital signal through selected signal conductors of said cable to said switch means for electrically interconnecting selected detector conduits and arrays of seismic detectors with said multichannel recorder.

11. The system of claim 10 wherein each of said signal conductors comprises a wire pair.

12. The system of claim 11 wherein said switch means comprises an integrated circuit having an outlet in electrical communication with a solid state switching device and each of said switch means being separately addressable by a signal.

13. The system of claim 12 wherein said signal is a binary electrical signal.

14. The system of claim 12 wherein said control means comprises a computer means for transmitting said binary electrical signal.

15. The system of claim 13 wherein said seismic detectors are geophones.

16. The system of claim 13 wherein said group of seismic detectors comprises from 1 to about 50 seismic geophones.

17. The system of claim 14 wherein from 1 to 50 switch means are provided for each of said conduits.

18. The system of claim 16 wherein the cable has from 100 to 200 takeouts located at evenly spaced distances along the length of the cable.

19. The system of claim 17 wherein each of the detector conduits has a length of from 200 to 300 feet and the geophones are located at substantially uniform intervals along its length.

20. The system of claim 16 wherein each of said conduits has from 5 to 25 switch means.

21. The system of claim 14 wherein each of said conduits has from 10 to 20 switch means.

* * * * *